(12) United States Patent
Fontana et al.

(10) Patent No.: US 9,321,920 B2
(45) Date of Patent: Apr. 26, 2016

(54) SELF-ASSEMBLY OF METALLIC NANOPARTICLES INTO MACROSCOPIC, HIGH-DENSITY, MONOLAYER FILMS

(71) Applicants: Jake Fontana, Alexandria, VA (US); Jawad Naciri, Arlington, VA (US); Banahalli R. Ratna, Alexandria, VA (US)

(72) Inventors: Jake Fontana, Alexandria, VA (US); Jawad Naciri, Arlington, VA (US); Banahalli R. Ratna, Alexandria, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 414 days.

(21) Appl. No.: 13/771,551

(22) Filed: Feb. 20, 2013

(65) Prior Publication Data

US 2013/0213265 A1    Aug. 22, 2013

Related U.S. Application Data

(60) Provisional application No. 61/601,305, filed on Feb. 21, 2012.

(51) Int. Cl.
| | |
|---|---|
| *C09D 1/00* | (2006.01) |
| *B22F 7/04* | (2006.01) |
| *B22F 1/00* | (2006.01) |
| *B22F 7/08* | (2006.01) |
| *B82Y 30/00* | (2011.01) |

(52) U.S. Cl.
CPC ............ *C09D 1/00* (2013.01); *B22F 1/0018* (2013.01); *B22F 1/0025* (2013.01); *B22F 1/0062* (2013.01); *B22F 7/04* (2013.01); *B22F 7/08* (2013.01); *B82Y 30/00* (2013.01); *B22F 2007/042* (2013.01); *B22F 2301/255* (2013.01); *Y10T 156/11* (2015.01)

(58) Field of Classification Search
None
See application file for complete search history.

(56) References Cited

PUBLICATIONS

Design and Characterization of Crystalline Thin Film Architectures at the Air-Liquid Interface: Simplicity to Complexity. Ivan kuzemenko et al Chem Rev 2001, 101, 1659-1696.*
Formation of Monolayer Films by Spontaneous Assembly of Organic Thiols From Solution Onto Gold. Colin Bain et al. J. Am. Chem. Soc. 1989, 111, 3210335.*
Colloidal Metal-Insulator—Metal Ensemble Chemiresustor Sensor. hank wohwitjen and Arthur Snow. Anal. Chem, 1998, 70, 2856-2859.*
Self-Assembled Gold Nanoparticle Thin Films With Nonmetallic Optical and Electronic Properties Mathias Brust, Donald Bethell, Christopher J. Kiely, and David J. Schiffrin Langmuir 1998, 14, 5425-5429.*

(Continued)

*Primary Examiner* — Melvin C Mayes
*Assistant Examiner* — Colette Nguyen
(74) *Attorney, Agent, or Firm* — US Naval Research Laboratory; Roy Roberts (57) ABSTRACT

A method of forming a monolayer film of nanoparticles includes forming a fluid mixture by combining nanoparticles dispersed in water with a water-miscible organic solvent and a molecular ligand comprising a head group with affinity for the nanoparticle, and introducing the fluid mixture to a substrate in the presence of an air/fluid interface, thereby causing a monolayer film of nanoparticles to form on the substrate. Such monolayers films can include metallic nanoparticles such as gold, and possess substantially uniform spacing over at least a one centimeter length scale.

17 Claims, 7 Drawing Sheets

(56) References Cited

PUBLICATIONS

Langmuir—Blodgett Film Deposition of Metallic Nanoparticles and Their Application to Electronic Memory Structures S. Paul, C. Pearson, A. Molloy, M.A. Cousins, M. Greem, S. Kolliopoulou, P. Dimitrakis, P. Normand, D. Tsoukalas, and M. C. Petty Letter 2003; vol. 3, No. 4, 533-536 Published on Web Mar. 5, 2003.*

Directed self-assembly of gold nanoparticles and gold thin films on micro- and nanopatterned templates fabricated from mixed phase-separated Langmuir-Blodgett films Satoshi Watanabe, Hirobumi Shibata, Fumitaka Sakamoto, Reiko Aqumi, Hideki Sakai, Masahiko Abe, and Mutsuyoshi Matsumoto Journal of Materials Chemistry, The Royal Society of Chemistry, J. Mater. Chem., 2009, 19, 6796-6803.*

* cited by examiner

SELF-ASSEMBLY OF METALLIC NANOPARTICLES INTO MACROSCOPIC, HIGH-DENSITY, MONOLAYER FILMS

CROSS-REFERENCE TO RELATED APPLICATIONS

This application claims the benefit of U.S. Provisional Application 61/601,305 filed on Feb. 21, 2012, the entirety of which is incorporated herein by reference.

BACKGROUND

Metamaterials are a large class of engineered materials. Metamaterial properties are determined from the organization of the constituents. Current metamaterial research is focused on novel optical devices, for example, flat sub-wavelength resolution macroscopic lenses (see refs. 1-5) and transformational optics (see refs. 3, 6-8). Top-down lithographic techniques (see refs. 9-12) have, in general, been used to create nanostructured metamaterials. Typically the processes are complex, time consuming, expensive, producing primarily 2D fixed structures with limited particle resolution. Another strategy to generate nanostructured metamaterials is bottom-up or self-assembly, but this has proved challenging, both from a fundamental and production approach, over the last decade (see refs. 13, 14). If an efficient self-assembly process can be realized to organize nanometer size constituents into macroscopic homogenized materials, then practical metamaterial devices may become possible.

Other investigators have suspended metallic nanoparticles in fluids for the purpose of making films. Deng (see ref. 15) developed a method for making nanoparticle films at the air-fluid interface and dip-coated a substrate into the suspension to remove the nanoparticles from the interface. However, the nanospheres were not packed efficiently in any positional order, the size of domains transferred onto the substrate was only submicron in size, the nanospheres were not capable of being phase transferred, the mechanism for the nanosphere aggregating at the air-fluid interface was not presented and the film had to be transferred onto required substrates. Jaeger (see ref. 16) evaporated sessile droplets of gold nanospheres and ligands in organic suspension. They achieved macroscopic, self-assembled, monolayer domains of gold nanospheres at the air-liquid interface, but the nanoparticles were only gold nanospheres, could not be transferred to other substrates and could not be crosslinked together to form a film. Sastry (see ref. 17) observed thin films of gold nanospheres confined between a liquid-liquid interface translate up a glass vial via Marangoni flow (see ref. 18). Spain (see ref. 19) observed silver nanospheres suspended in excess ligand and two immiscible fluids translate up the walls of a vial using Marangoni flow. Both Sastry and Spain required a liquid-liquid interface, the nanoparticles were only nanospheres and the films were not high-density crosslinked monolayers. Sastry (see ref. 20) also crosslinked gold nanosphere films at the liquid-liquid interface with benzene and anthracene, but the crosslinking was not controllable and only micron-size domains were presented. Hoyle (see ref. 21) claimed trithiol functionalized gold nanoaggregates dispersed in thiol-ene films; however, the nanoparticle density was very dilute (0-1 wt %).

A need exists for techniques effective in creating a continuous, uniform, and tightly-packed monolayer of nanoparticles, particularly at larger scales.

BRIEF SUMMARY

In a first embodiment, a method of forming a monolayer film of nanoparticles includes forming a fluid mixture by combining nanoparticles dispersed in water with a water-miscible organic solvent and a molecular ligand comprising a head group with affinity for the nanoparticle, and introducing the fluid mixture to a substrate in the presence of an air/fluid interface, thereby causing a monolayer film of nanoparticles to form on the substrate.

In another embodiment, a method of forming a monolayer film of metallic nanoparticles includes combining metallic nanoparticles in water with an ionic surfactant, tetrahydrofuran (THF), and thiol-ligands to form a fluid mixture, and introducing the fluid mixture to a substrate in the presence of an air/fluid interface, thereby allowing a monolayer film of metallic nanoparticles to form on the substrate.

In a further embodiment, a monolayer film comprises metallic nanoparticles having substantially uniform spacing over at least a one centimeter length scale.

Additional details regarding various aspects of this technology are contained in the publication of J. Fontana et al., Adv. Optical Mater. 2013, 1, 100-106, and accompanying Supporting Information, all of which is incorporated herein by reference.

BRIEF DESCRIPTION OF THE DRAWINGS

FIGS. 4a through 4d show crosslinked centimeter size monolayer domains of thiol-ene functionalized 17 nm gold nanospheres films heavily washed with chloroform after film deposition. FIGS. 4e through 4f show uncrosslinked thiol-ene functionalized 40 nm gold nanospheres films gently washed with chloroform after film deposition.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "nanoparticle" refers to a particle having a largest dimension of no greater than 100 nanometers.

Description

Described herein is a simple, fast, inexpensive, efficient and scalable process that functionalizes and self-assembles nanoparticles into macroscopic monolayer films using phase separation, transporting the films onto the desired substrate using surface tension gradients.

Figure 1:
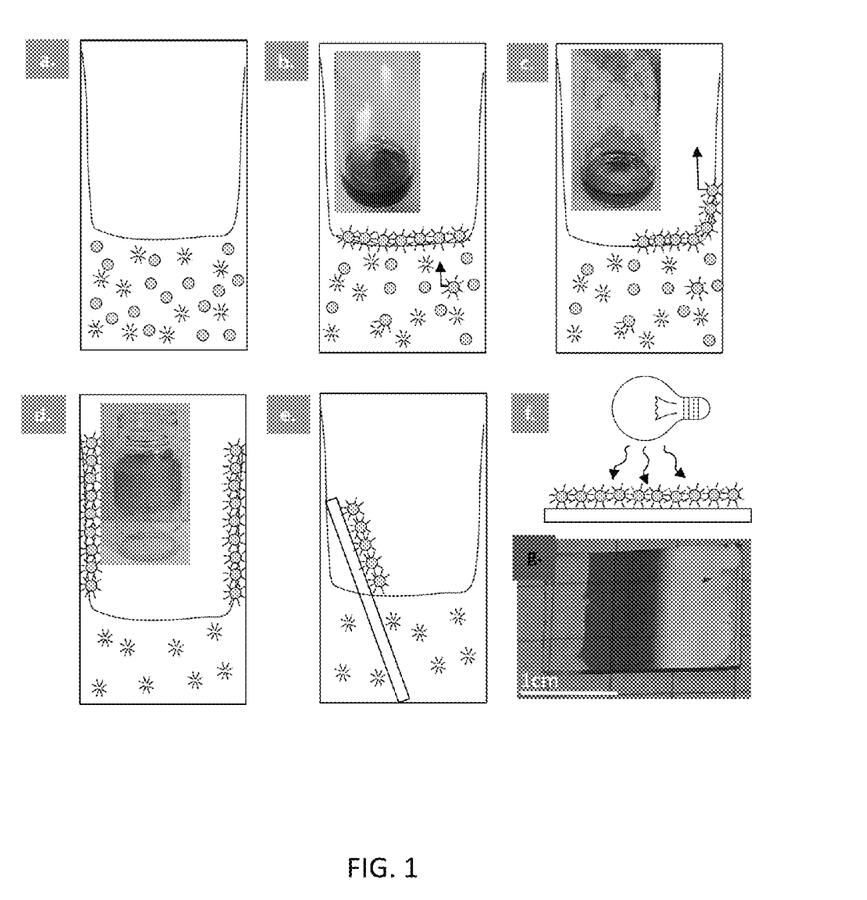
FIG. 1a schematically illustrates a vial containing an emulsion of metallic nanoparticles, ligands, tetrahydrofuran and water.
FIG. 1b depicts phase separation and metallic nanoparticle film formation, with the inset image showing initial gold nanosphere film formation.
FIG. 1c shows metallic nanoparticle film transport using surface tension gradients, with the inset image showing gold films translating up the sides of the vial.
FIG. 1d shows the end of the phase transfer and transport process, where nearly all nanoparticles have been removed from the suspension, while the inset image shows gold nanosphere films attached to the sides of the vial.
FIG. 1e depicts a simple method to transport the nanoparticle films onto a substrate.
FIG. 1f shows schematically the exposure of UV-light to the film, initiating the click reaction (e.g., thiol-ene or thiol-yne) and crosslinking the films.
FIG. 1g shows a gold nanosphere-crosslinked film on a glass substrate is partially transmitting light (left side), demonstrating preservation of the plasmon resonances, optical clarity and reflecting light (right side), demonstrating a high volume fraction of nanoparticles.

The self-assembly process can be schematically represented in FIGS. 1a to 1g. There are three primary constituents in this system: nanoparticles dispersed in water (such as metallic nanoparticles suspended using an ionic surfactant), a water-miscible organic solvent such as tetrahydrofuran (THF), and molecular ligands. Macroscopic, self-assembled metallic nanoparticle monolayer films were produced by first placing aqueous suspended nanoparticles into a glass vial. Thiol-containing molecular ligands, such as thiol-ene and thiol-alkane, were suspended in THF at a concentration sufficient to cover at least the entire surface area of the nanoparticles. The ligand-THF solution was added to the aqueous nanoparticle suspension and mixed. The reaction leads to an emulsion of metallic nanoparticles, ligands, THF, and water, as seen in FIG. 1a. Water and THF are miscible, the introduction of the thiol-ligands into the solution, with one end of the ligand more hydrophobic than the other, causes a phase separation and the solution to scatter light. The thiol-ligands then quickly begin to graft to the nanoparticles in suspension, facilitating phase transfer of the nanoparticles to become hydrophobic. The higher vapor pressure and lower density of THF, relative to water, causes the THF to move towards the air-fluid interface, carrying the phase-transferred nanoparticles to the air-fluid interface, as seen in FIG. 1b. Within seconds after mixing, films of metallic nanoparticles begin to form at the air-fluid interface, eventually covering the entire surface of the interface.

The vigorous shaking also leads to wetting of the solution on the sides of the vial, leaving behind a thin film of solution. The increased surface-to-volume ratio in the thin film of solution on the side of the vial and the differences in vapor pressures between solvent (such as THF) and water lead to a relative reduction of solvent in the thin film, or a concentration gradient, between the thin film and bulk solutions. The concentration gradient of THF causes a surface tension gradient, i.e. a pressure difference, between the thin film and bulk solutions which in turn causes fluid to flow from the low to high surface tension areas (Marangoni flow) (see refs. 16, 18, 24, 25). The fluid flow induced by the surface tension gradient carries the metallic nanoparticle films up the sides of the vial, as seen in FIG. 1c. The nanoparticle film formation and transport continues until nearly all the nanoparticles have been removed from the suspension, as seen in FIG. 1d.

The nanoparticle films can be transferred onto a substrate by, for example, placing the substrate, such as glass or silicon, into the vial prior to shaking, as seen in FIG. 1a. After shaking, the metallic nanoparticle films translate up the substrates similarly to the sides of the glass vial, as seen in FIG. 1e.

Figure 7A:
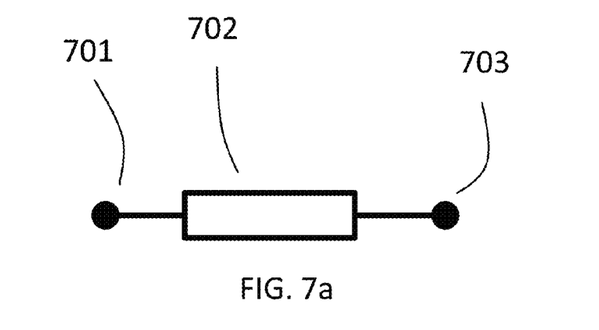
FIG. 7a is a schematic illustration of a molecular ligand as described herein.
Figure 7B:
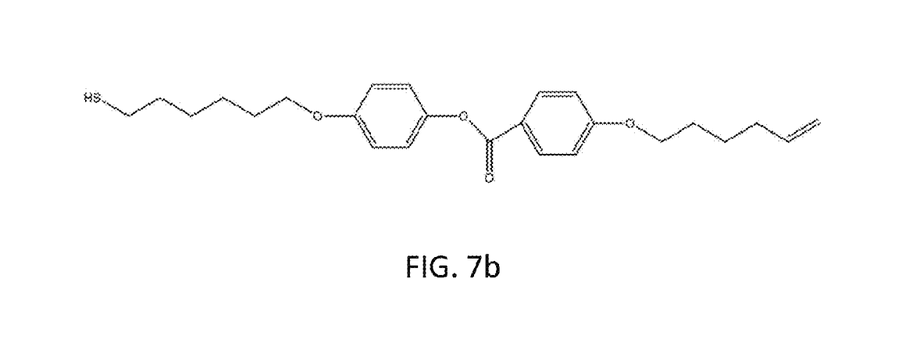
FIGS. 7b and 7c show the exemplary molecular ligands SC6V and SC6S, respectively.
Figure 7C:
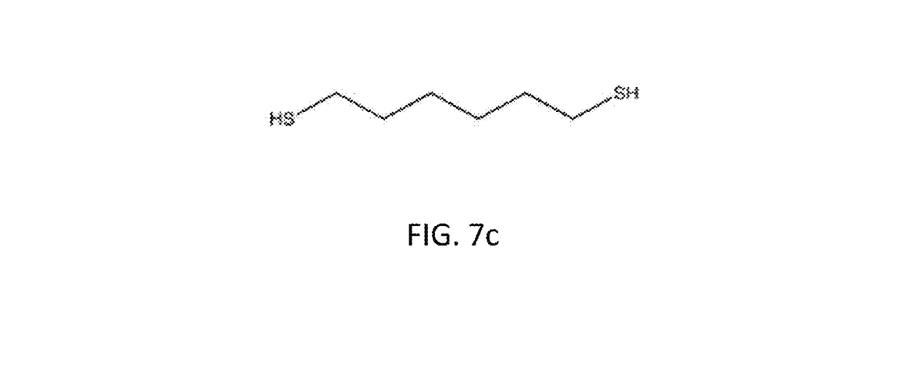

FIG. 7a schematically illustrates an exemplary molecular ligand. A head group 701 has an affinity for the nanoparticle and can be, for example, thiol, isocyanide, or phosphine. An optional linker 702 can be rigid (such as an aromatic group) or flexible, such as an alkane. A tail group 703 is preferably incorporated and provides further functionality such allowing for chemical crosslinking (e.g., via click chemistry), conjugation to other molecules for added functionality, or optionally may provide nanoparticle binding affinity as does the head group 701. Exemplary tail groups include terminal alkene or alkyne, carboxylic acid, and amine. The molecular ligand can be conducting or nonconducting. Multiple types of molecular ligand may be employed in a single film-forming reaction. The exemplary molecular ligands SC6V and SC6S are depicted in FIGS. 7b and 7c, respectively.

Advantages and New Features

The described process provides a simple, fast, inexpensive, efficient and scalable process to self-assembled, high-density (e.g., with consistent edge-to-edge spacing of less than one particle diameter), centimeter-size domains of functionalized metallic nanoparticle monolayer films. It allows for phase transferring nanoparticles simply and efficiently and recovering nearly all nanoparticles from the initial suspension. The process allows for the phase transfer and transport of metallic nanoparticles of various sizes, shapes and compositions, and is believed to be operable on non-metallic nanoparticles. The process of phase transfer and film transport is possible using a wide variety of ligands such as thiol-y/ene and thiol-alkane. If the nanoparticles are functionalized with thiol-y/ene ligands a wide variety of molecules and/or nanoparticles may be attached to the nanoparticles using click chemistry. Very little support equipment is required, relative to top-down techniques, making the process relatively inexpensive. The process is scalable to orders of magnitude larger substrates. It allows for nearly perfect hexagonal packing of nanospheres for monolayer films with centimeter dimensions while preserving the plasmon resonances.

Functionalization of nanoparticles, modified for click chemistry, enable the nanoparticles to translate and reconfigure prior to crosslinking. The functionalized nanoparticles modified for click chemistry allow for straightforward crosslinking of the nanoparticles into high-density films, possibly without a substrate and with no need for a host material to disperse and/or support the final nanoparticle structure.

The process allows for multiple monolayer films to be built into three-dimensional structures by repeating the deposition cycle, not necessarily with the same nanoparticles, orientation, position or dimensions for each layer.

Variations

Functional ligands, such as dyes and liquid crystal molecules, may be used to tune the optical and mechanical properties of the films. Other water-miscible organic solvents (singly or in combination) may be used in place of the THF and/or the water used in the examples. Suitable solvents may include, for example, 2-methyltetrahydrofuran, acetone, methanol, DMSO, and acetonitrile. Ridged, flexible, rigid, flat, curved, patterned or composite substrates may be used to position and orient the films. The substrates may be modified with a variety of surface chemistries. The films may be free-standing without the need for a substrate.

Surfactants and/or ligands may be used to change the surface tension at the air-fluid interface to control orientational and/or positional order of the nanoparticles (for example, rod-shaped nanoparticles could be oriented on end or flat). Electric and magnetic fields may be used to assist the positional and orientational order of the nanoparticle assemblies. The process of monolayer formation may also be regulated by the application of pressure or optical or other electromagnetic radiation (e.g. at wavelengths effective to manipulate the nanoparticles).

This technique is applicable to nanoparticles of a variety of compositions and geometries. The technique is expected to operate on other types of nanoparticles beyond the metallic particles tested, including those of polymeric composition, or composed of semiconductors, biomolecules (including viruses and modified versions thereof), inorganic and organic materials, and combinations thereof. The technique is expected to operate with a wide variety of nanoparticle geometries/shapes in addition to the spherical and rod-shaped particles tested.

The process may be used to filter different size, shape or materials particles.

Monolayer films prepared as described may be useful as substrates for surface-enhanced Raman scattering (SERS).

EXAMPLES

Example 1

Phase Transfer of Gold Nanospheres

Figure 2:
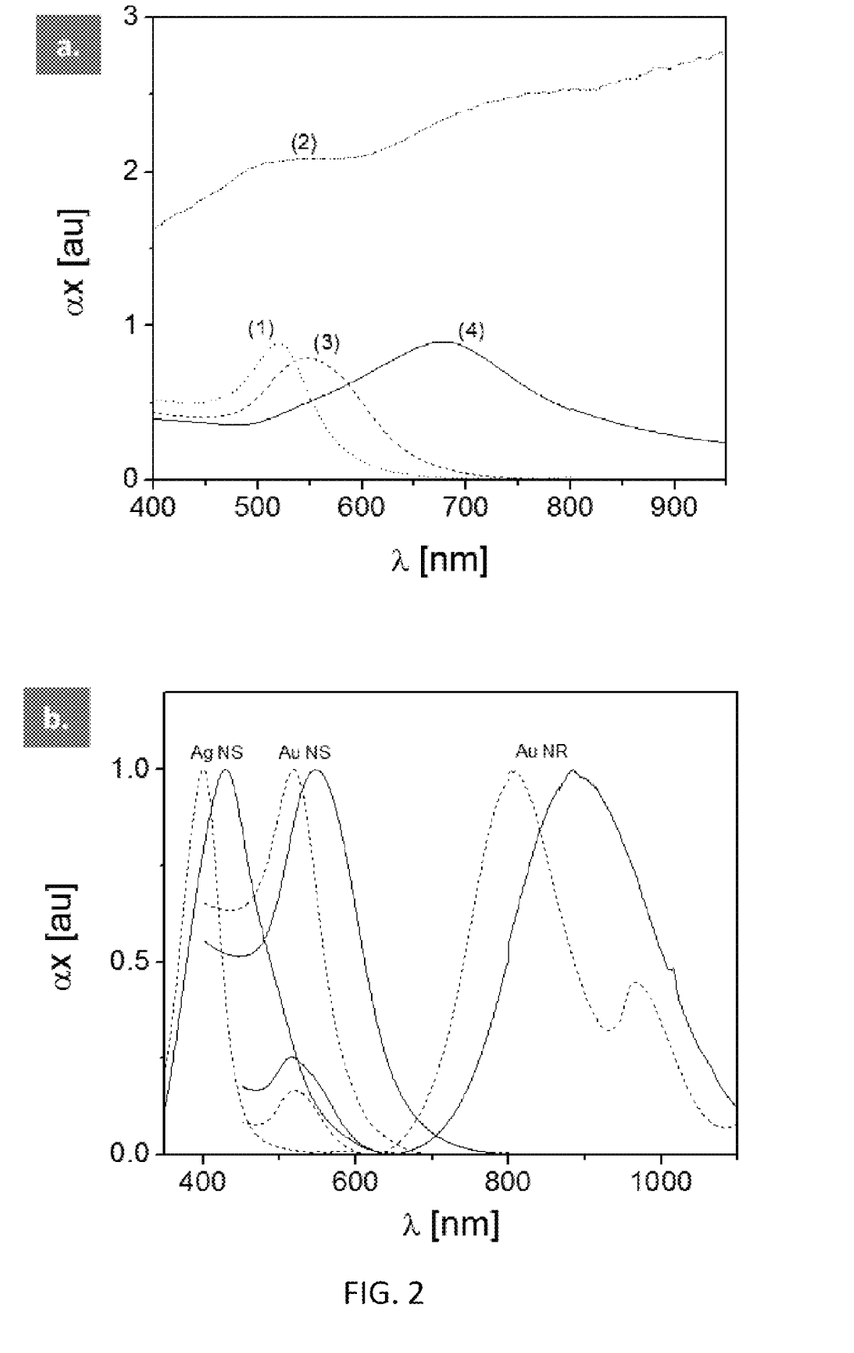
FIG. 2a shows absorbance spectra for 17 nm gold nanospheres suspended in water (1: dotted line), the nanoparticle-water-THF-ligand emulsion immediately after mixing all the constituents (2: dash-dot-dot line), the nanospheres resuspended in chloroform after phase transferring (3: dashed line) and in a crosslinked film on a glass substrate (4: solid line).
FIG. 2b shows normalized absorbance spectra for the phase transfer for 20 nm silver nanospheres (Ag NS), 10 nm gold nanospheres (Au NS) and 10×45 nm gold nanorods (Au NR) suspended in water (dotted line) to chloroform (solid line).

Typically, 1 ml of concentrated aqueous nanosphere suspension (e.g. 17 nm Nanopartz Accurate Spherical Gold Nanoparticles, citrate-stabilized, volume fraction=$10^{-5}$) is placed in a 20 ml borosilicate glass vial. In a separate 5 ml borosilicate glass vial, typically 5 mg of SC6V (FIG. 7b) (see J. Lub et al, Liebigs Ann. Recl., 1997, 2281, incorporated herein by reference) is dissolved in 1 ml of tetrahydrofuran (THF). The SC6V-THF solution is added to the aqueous nanoparticle suspension and the mixture is vigorously shaken for 30 s. Gold nanosphere films then form at the air-fluid interface and travel up the sides of the vial. After substantially all of the gold nanospheres were removed from the solution, FIG. 1d, the remaining solution at the bottom of the vial can be decanted and nitrogen is used to quickly evaporate any residual fluid. The side of the vial was washed with 1 ml of chloroform and sonicated for 60 seconds. The gold nanospheres were re-suspended in the organic solvent. FIG. 2a shows the absorbance for the initial suspension of 17 nm gold nanospheres suspended in water (dotted black line). FIG. 2a (dashed black line) is the absorbance for the nanosphere-ligand-THF-water emulsion measured immediately after mixing all the constituents together. FIG. 2a (solid black line) is the absorbance of the 17 nm gold nanospheres re-suspended in chloroform, with very little degradation to their plasmon resonances.

Example 2

Phase Transfer of Metallic Nanoparticles

The process was also used for anisotropic nanoparticles such as gold nanorods, and silver nanospheres FIG. 2b, demonstrating metallic nanoparticles of different size, shape and composition worked well with this process. Gold nanospheres from Nanopartz, BBI international and SPI worked equally well regardless of the ionic surfactants.

Example 3

Transport of Gold Nanosphere Monolayer Films onto Substrates

Gold nanospheres were transported onto 12×25 mm glass and silicon substrates by adding the substrate to the vial prior to mixing, as in FIG. 1a. After shaking the gold nanosphere films translated up the substrates similarly to the sides of the glass vial, seen in FIG. 1e. If the substrate was hydrophobic, such as Teflon, then film transport onto the substrate would not occur, and the nanoparticles would be confined to the air-fluid interface.

The absorbance for the nanosphere film on a glass substrate, FIG. 1f (bottom), was measured with results shown in FIG. 2a (solid black line). From the absorbance the thickness of the films can be determined. If the nanospheres are assumed to be a hexagonally packed, the number density can be estimated to be $\rho=2.8\times10^{23}$ [NP/m$^3$]. The absorption cross-section was provided from calculations (Nanopartz, Inc.) to be $\sigma=9.0\times10^{-17}$ [m$^2$]. The film thickness was then calculated to be $x=\alpha x/\rho\sigma=18$ nm, demonstrating the films were only a monolayer thick on the glass substrates.

Example 4

Thiol-ene Functionalized Gold Nanospheres into Crosslinked Monolayer Films

Typically, 1 ml of concentrated aqueous nanosphere suspension (e.g. 17 nm Nanopartz Accurate Spherical Gold Nanoparticles, volume fraction=$10^{-5}$) is placed in a 20 ml borosilicate glass vial. In a separate 5 ml borosilicate glass vial, typically 5 mg of SC6V (FIG. 7b) is dissolved in 1 ml of tetrahydrofuran (THF), then 5 µl of SC6S (FIG. 7c) (1,6-hexanedithiol) is added to the vial. The SC6V-SC6S-THF solution is added to the aqueous nanoparticle suspension, and the mixture is vigorously shaken for 30 s. In one experiment described here, photoinitiator (1 wt %) was also added (e.g. Irgacure 369), although found not to be necessary given the intensity of the UV light source employed (Dymax Bluewave 200, $\lambda$=280-450 nm, I=40 W/cm$^2$).

Gold nanospheres films began to form at the air-fluid interface and then travel up the sides of the vial or substrate. Once the reaction was complete the nanoparticles were exposed to UV-light for several seconds crosslinking the nanoparticles together, via click chemistry (see ref. 22), FIG. 1f, into a solid film.

Example 5

Ligand Kinetics

Figure 3:
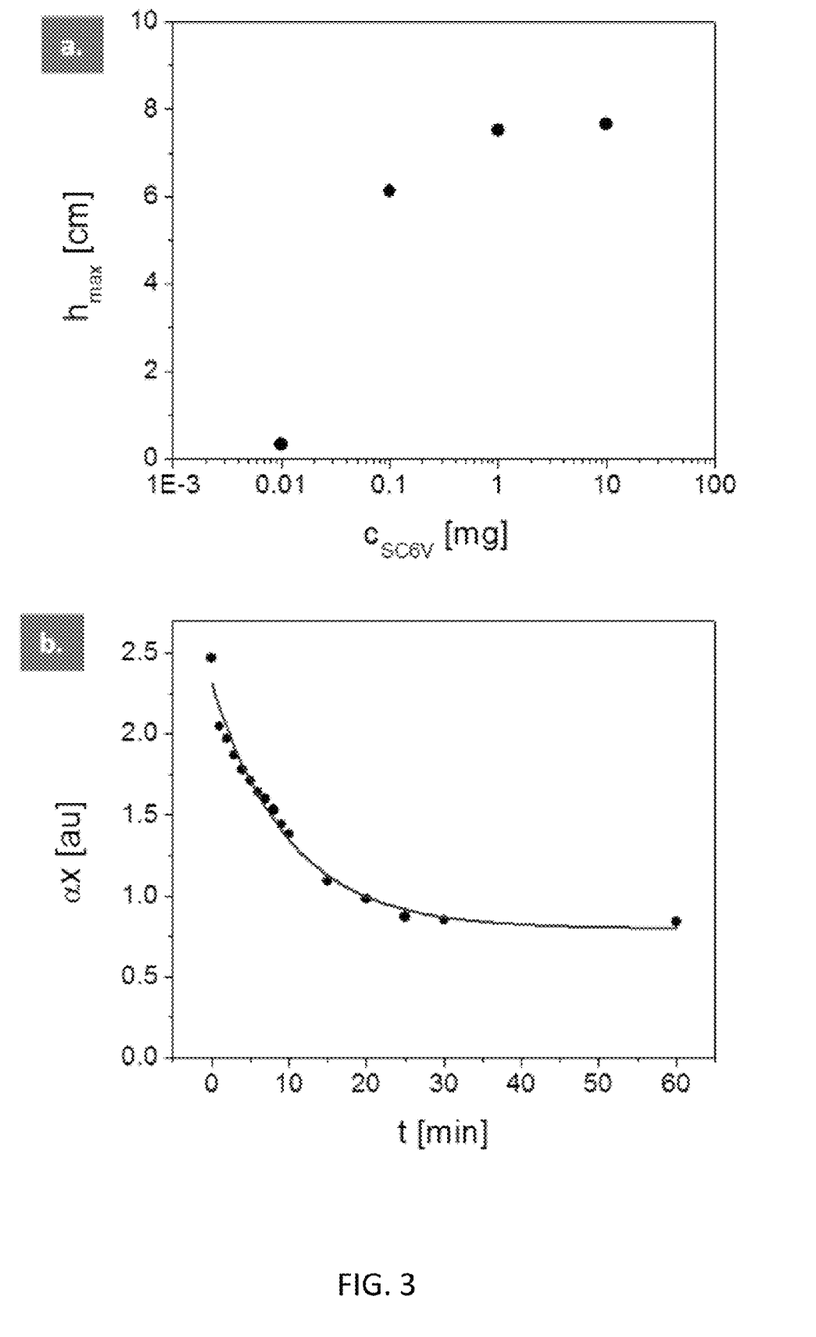
FIG. 3a shows the maximum height of 17 nm gold nanosphere films above the air-fluid interface as a function of SC6V concentration.
FIG. 3b shows the absorbance spectrum of 17 nm gold nanospheres, at the absorption peak maximum ($\lambda_{max}$=520 nm), remaining in suspension versus time.

To understand the effects of the ligand concentration, the maximum height the nanosphere films travel up the side of the vial versus SC6V concentration was studied with the concentrations of gold nanospheres, THF and water held constant, as shown in FIG. 3a. If no ligands were added to the suspension or if dimethyl sulfoxide (vapor pressure=$5\times10^{-3}$ kPa) was used in place of THF then the gold films did not form at the air-fluid interface nor did any gold translate up the sides of the vial. The mass of SC6V required to cover all the surface area of the gold nanospheres was estimated to be $m_{SC6V}$=0.09 mg ($\rho_{SC6V}$=$1.53\times10^3$ [kg/m$^3$]); this corresponds well to the experimentally observed increase in maximum film height in FIG. 3a between 0.01-0.1 mg of SC6V. If 40 nm gold nanospheres were used in place of the 17 nm nanospheres, the maximum height of the gold film up the side of the vial was approximately 4 cm. Although the film height was approximately constant for ligand concentrations above 1 mg of SC6V, the rate of the nanosphere film formation and size increased with increasing excess ligand concentration.

To determine the rate of nanosphere removal from suspension, the absorbance was measured as a function of time with initial concentrations of SC6V (5 mg), 17 nm Au nanospheres (1 ml in water), THF (1 ml), FIG. 3b. An unpolarized white light (Oriel 68806, 50-200 W) and spectrometer (Oceanoptics Redtide USB650 spectrometer) were used to measure the absorbance of the suspension contained in a 10 mm path length quartz cuvette. Nearly all the nanospheres were removed from the suspension within one hour, as shown in FIG. 3b. The data in FIG. 3b fits well with an exponential function, $\alpha x = 1.52 e^{-0.10 t} + 0.76$ assuming the rate of evaporation is the primary mechanism for nanosphere removal and is exponential in form. The apparent absorbance, after the removal of the nanospheres, is due to scattering from the ligand clusters remaining in the solution.

Example 6

SEM Characterization

Figure 4:
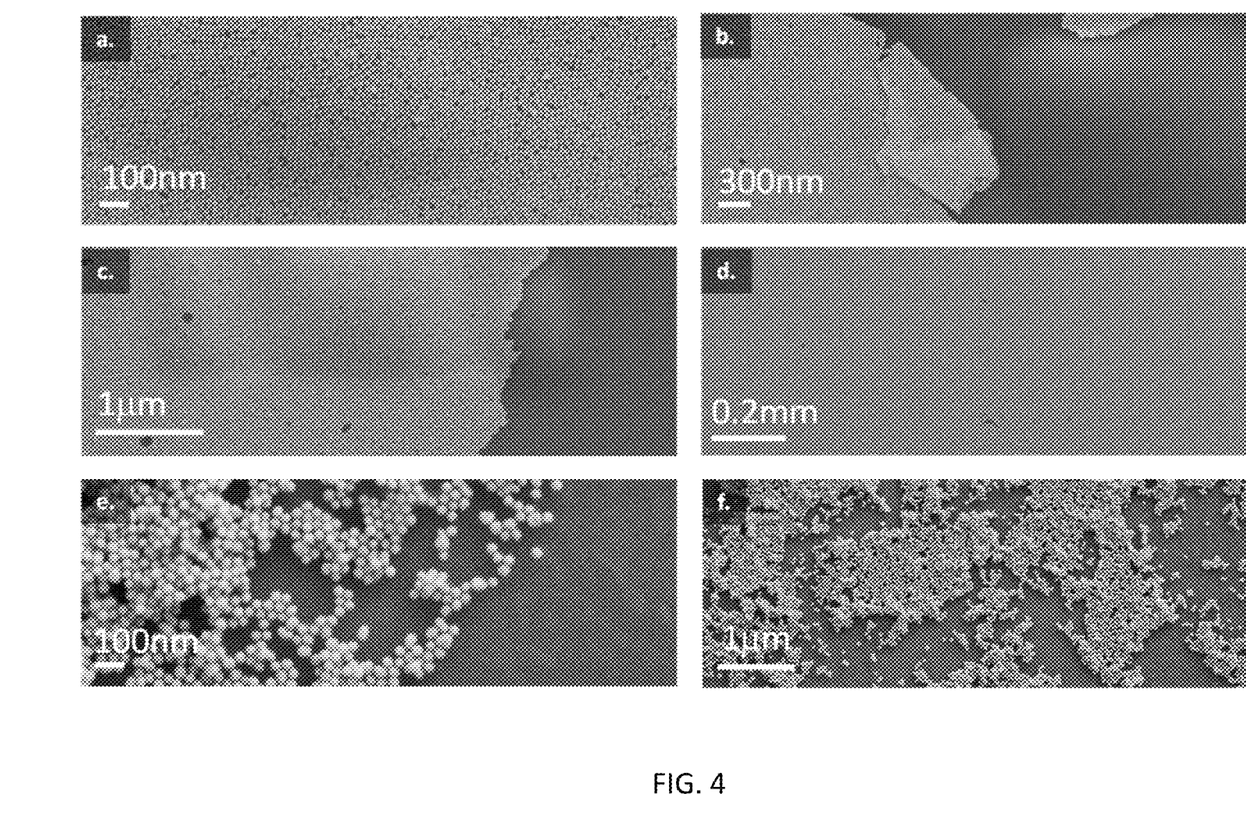
FIGS. 4a through 4f are scanning electron microscopy (SEM) images of gold nanospheres on silicon wafer substrates.

Gold nanospheres were functionalized with SC6V and SC6S ligands using the process described in Example 4 and transferred onto silicon wafer substrates, similarly to Example 3, to examine the microscopic structure using a scanning electron microscope, SEM (Carl Zeiss, Model 55). FIGS. 4a-d are SEM images of 17 nm thiol-ene functionalized gold nanospheres that were exposed to UV light for several seconds, crosslinking the films. Several milliliters of chloroform were forcibly sprayed onto the films using a pipette to remove any excess ligands. FIGS. 4a-d demonstrates robust, crosslinked monolayer films over centimeter-size domains. In contrast, if the films were not exposed to UV light they were easily washed away with organic solvents. FIGS. 4e-f are SEM images of 40 nm thiol-ene functionalized gold nanospheres that were not exposed to UV light therefore not crosslinked together. Several drops of chloroform where used to gently wash away any excess ligand; however even the gentle washing destroyed the hexagonally packed nanosphere monolayer film.

Example 7

Multi-Layered Gold Nanosphere Films

Figure 5:
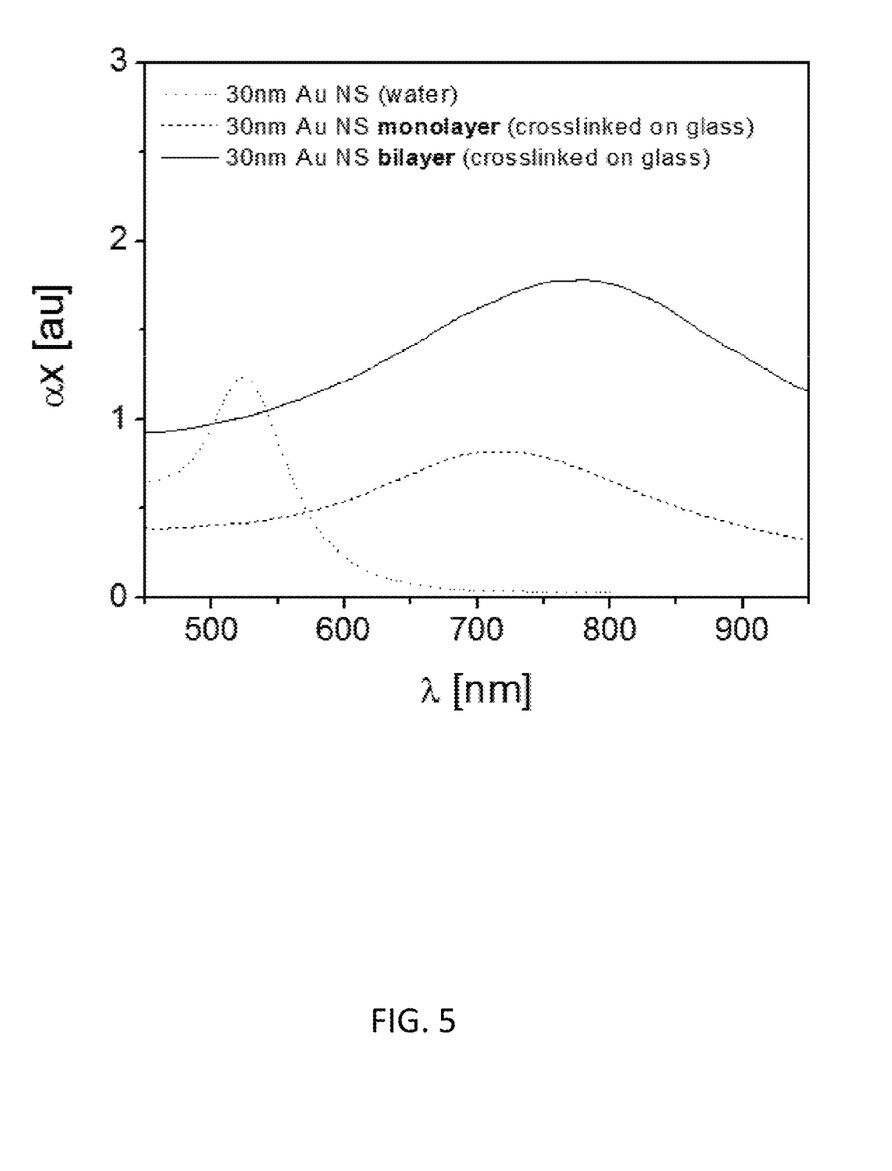
FIG. 5 shows absorbance spectra for 30 nm gold nanospheres, suspended in water (dotted black line), crosslinked monolayer film on a glass substrate (dashed black line) and crosslinked bilayer film on a glass substrate (dashed black line).

After one monolayer was transferred onto a glass substrate, as in FIG. 1e, the substrate was removed from the vial, held outside the vial for 30 s and then placed back into the vial. Another monolayer film was translated onto the initial monolayer, creating a bilayer film. The absorbance of the nanospheres in water, crosslinked into a monolayer film on a glass substrate, and crosslinked into a bilayer film on a glass substrate are shown in FIG. 5.

Although shifted due to particle-particle coupling, the plasmon resonances were preserved very well for the crosslinked monolayer film, as seen in FIG. 2a (solid black line), given the ultra high-density of nanospheres, FIG. 4a, making this self-assembly process a promising candidate for the pragmatic assembly of metamaterials.

Example 8

Near-Zero Effective Refractive Index Metamaterials at Visible Frequencies

Figure 6:
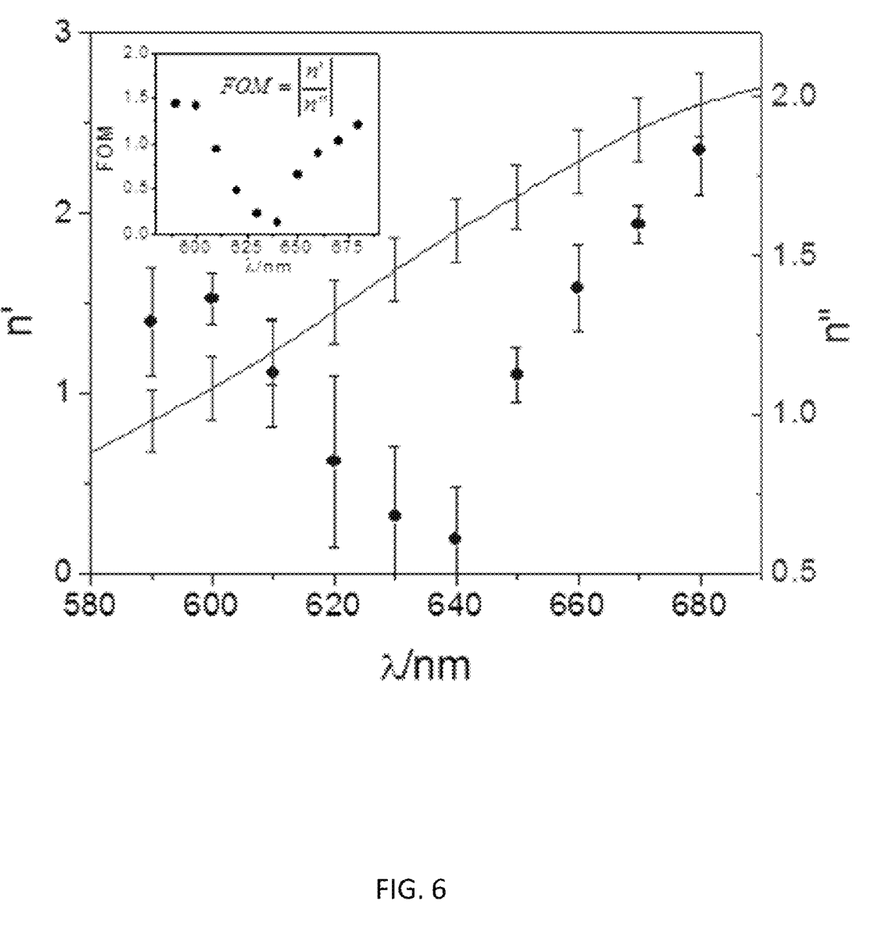
FIG. 6 shows the refractive index of a crosslinked 17 nm gold nanosphere monolayer film with real (dotted graph points, left Y-axis) and imaginary (non-dotted graph points, right Y-axis) refractive index as a function of wavelength. The inset is the figure of merit.

The metamaterial comprises gold nanospheres self-assembled into crosslinked, monolayer films as described in Example 4. By measuring the real and imaginary parts of the phase shift of light transmitted through the films, using a Mach-Zehnder interferometer, the effective index of refraction was determined as a function of wavelength, as seen in FIG. 6. This demonstrate a self-assembled metamaterial exhibiting a positive near-zero index of refraction at visible wavelengths.

CONCLUDING REMARKS

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

REFERENCES

Each of the following documents is incorporated herein by reference in its entirety:

1. Fontana, J. P., *Self-assembly and characterization of anisotropic metamaterials.* 2011, Kent State University. p. 162.
2. Zhang, X. and Z. W. Liu, *Superlenses to overcome the diffraction limit.* Nature Materials, 2008. 7(6).
3. Smolyaninov, I. I., *Transformational optics of plasmonic metamaterials.* New Journal of Physics, 2008. 10.
4. Veselago, G. and E. E. Narimanov, *The left hand of brightness: past, present and future of negative index materials.* Nature Materials, 2006. 5(10): p. 759-762.
5. Engheta, N. and A. Alu, *The quest for magnetic plasmons at optical frequencies.* Optics Express, 2009. 17(7): p. 5723-5730.

6. Caldwell, J. D., et al., *Plasmonic Nanopillar Arrays for Large-Area, High-Enhancement Surface-Enhanced Raman Scattering Sensors*. Acs Nano, 2011. 5(5): p. 4046-4055.
7. Saxe, R. L., *Anisometrically shaped metal particles, liquid suspensions and films thereof and light valves comprising same*. 2003, Research Frontiers Incorporated: USA.
8. Driscoll, T., et al., *Memory Metamaterials*. Science, 2009. 325(5947): p. 1518-1521.
9. Ahn, S. H. and L. J. Guo, *High-speed roll-to-roll nanoimprint lithography on flexible plastic substrates*. Advanced Materials, 2008. 20(11): p. 2044-+.
10. Engheta, N., *Circuits with light at nanoscales: Optical nanocircuits inspired by metamaterials*. Science, 2007. 317(5845): p. 1698-1702.
11. Quake, S. R. and A. Scherer, *From micro-to nanofabrication with soft materials*. Science, 2000. 290(5496): p. 1536-1540.
12. Sundaramurthy, A., et al., *Toward nanometer-scale optical photolithography: Utilizing the near-field of bowtie optical nanoantennas*. Nano Letters, 2006. 6(3): p. 355-360.
13. Shalaev, V. M., *Optical negative-index metamaterials*. Nature Photonics, 2007. 1(1): p. 41-48.
14. Sihvola, A., *Metamaterials: A Personal View*. Radioengineering, 2009. 18(2): p. 90-94.
15. Deng, T. and L. Smentkowski, *Method for forming nanoparticle films and application thereof*. 2007.
16. Jaeger, H. M., et al., *Kinetically driven self assembly of highly ordered nanoparticle monolayers*. Nature Materials, 2006. 5(4): p. 265-270.
17. Sastry, M. and K. S. Mayya, *A new technique for the spontaneous growth of colloidal nanoparticle superlattices*. Langmuir, 1999. 15(6): p. 1902-1904.
18. Shikhmurzaev, Y. D., *Capillary flows with forming interfaces*. 2008.
19. Spain, E. M., et al., *Marangoni flow of Ag nanoparticles from the fluid-fluid interface*. Journal of Physical Chemistry A, 2008. 112(39): p. 9318-9323.
20. Chaudhari, R. V., et al., *Benzene-and anthracene-mediated assembly of gold nanoparticles at the liquid-liquid interface*. Langmuir, 2002. 18(17): p. 6478-6483.
21. Phillips, J. P., et al., *Dispersion of Gold Nanoparticles in UV-Cured, Thiol-Ene Films by Precomplexation of Gold-Thiol*. Chemistry of Materials, 2008. 20(16): p. 5240-5245.
22. Bowman, C. N., C. E. Hoyle, and A. B. Lowe, *Thiol-click chemistry: a multifaceted toolbox for small molecule and polymer synthesis*. Chemical Society Reviews, 2010. 39(4): p. 1355-1387.

What is claimed is:

1. A method of forming a monolayer film of nanoparticles, the method comprising:
   forming a fluid mixture by combining a plurality of nanoparticles dispersed in water, a water-miscible organic solvent, and a plurality of molecular ligands comprising head groups having affinity for the nanoparticles; and
   introducing the fluid mixture to a substrate in the presence of an air/fluid interface, thereby causing a monolayer film of nanoparticles to form on the substrate,
   wherein the steps of forming the fluid mixture and introducing said fluid mixture to a substrate in the presence of the air/fluid interface are sufficient to cause formation of the monolayer film of nanoparticles.

2. The method of claim 1, wherein said nanoparticles are metallic.

3. The method of claim 2, wherein said nanoparticles are gold.

4. The method of claim 1, wherein said nanoparticles comprise a polymer, semiconductor, biomolecules, inorganic and/or organic materials, or combination thereof.

5. The method of claim 1, wherein said nanoparticles have spherical or rod-shaped geometry.

6. The method of claim 1, wherein
   said head group of said molecular ligand comprises thiol, isocyanide, or phosphine; and
   said molecular ligand further comprises a tail group of terminal alkene or alkyne, carboxylic acid, thiol, or amine.

7. The method of claim 1, wherein the water-miscible organic solvent is selected from the group consisting of tetrahydrofuran (THF), 2-methyltetrahydrofuran, acetone, methanol, DMSO, and acetonitrile.

8. The method of claim 1, wherein the nanoparticles are functionalized with ligands for click chemistry.

9. The method of claim 1, further comprising crosslinking the monolayer film.

10. The method of claim 1, further comprising depositing one or more additional monolayer films atop said monolayer film.

11. The method of claim 1, wherein said substrate is ridged, flexible, rigid, flat, curved, patterned, and/or composite and is optionally modified with one or more surface chemistries.

12. The method of claim 1, wherein the combining occurs in a vessel, and:
   (1) said substrate is an interior wall of the vessel, or
   (2) said substrate is apart from the vessel.

13. The method of claim 1, further comprising separating said substrate from said monolayer film and obtaining a free-standing monolayer film.

14. The method of claim 1, wherein said fluid mixture further comprises surfactants and/or ligands operable to modify surface tension at said air/fluid interface, thereby controlling orientational and/or positional order of said nanoparticles.

15. A method of forming a monolayer film of nanoparticles, the method comprising:
   forming a fluid mixture by combining a plurality of nanoparticles dispersed in water, a water-miscible organic solvent, and a plurality of molecular ligands comprising head groups having affinity for the nanoparticles; and
   introducing the fluid mixture to a substrate in the presence of an air/fluid interface, thereby causing a monolayer film of nanoparticles to form on the substrate, while applying pressure, electromagnetic radiation, and or an electric and/or magnetic field effective to control positional order and/or orientation of said nanoparticles during formation of said monolayer film.

16. A method of forming a monolayer film of metallic nanoparticles, the method comprising:
   combining metallic nanoparticles in water with an ionic surfactant, tetrahydrofuran (THF), and thiol-ligands to form a fluid mixture, and
   introducing the fluid mixture to a substrate in the presence of an air/fluid interface in a manner effective to evaporate the THF more quickly than the water, thereby allowing a monolayer film of metallic nanoparticles to form on the substrate.

17. The method of claim 16, wherein said metallic nanoparticles are gold.

* * * * *